US012810673B2

(12) United States Patent
Rodriguez Osorio et al.

(10) Patent No.: US 12,810,673 B2
(45) Date of Patent: *Nov. 24, 2026

(54) ASSET MANAGEMENT DEVICE WITH AUTOMATIC CONFIGURATION DETECTION

(71) Applicant: SIGNIFI SOLUTIONS INC., Mississauga (CA)

(72) Inventors: Emil Jose Rodriguez Osorio, Etobicoke (CA); Natalia Rubaeva, North York (CA); Yong Suk Jin, Oakville (CA); Shamira Jaffer, Mississauga (CA)

(73) Assignee: SIGNIFI SOLUTIONS INC., Mississauga (CA)

( * ) Notice: Subject to any disclaimer, the term of this patent is extended or adjusted under 35 U.S.C. 154(b) by 122 days.

This patent is subject to a terminal disclaimer.

(21) Appl. No.: 18/785,808

(22) Filed: Jul. 26, 2024

(65) Prior Publication Data

US 2024/0386764 A1 Nov. 21, 2024

Related U.S. Application Data

(63) Continuation-in-part of application No. 18/425,362, filed on Jan. 29, 2024, now Pat. No. 12,387,541.

(60) Provisional application No. 63/441,647, filed on Jan. 27, 2023.

(51) Int. Cl.
*G08B 21/00* (2006.01)
*G07C 9/00* (2020.01)

(52) U.S. Cl.
CPC ................................ *G07C 9/00896* (2013.01)

(58) Field of Classification Search
CPC ...... G07C 9/00182; G07C 2009/00277; G07C 9/00896; G07C 9/00571; G07C 9/00912; E05B 65/46; A47B 67/04; G06Q 10/087
USPC .................................................. 340/5.7, 5.73
See application file for complete search history.

(56) References Cited

U.S. PATENT DOCUMENTS

| | | | | |
|---|---|---|---|---|
| 5,190,185 | A | | 3/1993 | Blechl |
| 5,377,864 | A | | 1/1995 | Blechl et al. |
| 5,745,366 | A | | 4/1998 | Higham et al. |
| 5,805,455 | A | | 9/1998 | Lipps |
| 5,805,456 | A | * | 9/1998 | Higham .............. G07F 17/0092 312/215 |
| 5,905,653 | A | | 5/1999 | Higham et al. |
| 5,927,540 | A | | 7/1999 | Godlewski |
| 6,039,467 | A | | 3/2000 | Homes |

(Continued)

FOREIGN PATENT DOCUMENTS

| | | | |
|---|---|---|---|
| AU | 2021247022 | A1 | 9/2022 |
| EP | 0954800 | B1 | 7/2013 |
| WO | WO-2021202176 | A1 | 10/2021 |

*Primary Examiner* — Mark S Rushing
(74) *Attorney, Agent, or Firm* — Perry + Currier Inc.

(57) ABSTRACT

An example device includes: an enclosure; a plurality of storage units supported in the enclosure, each storage unit having a storage unit release mechanism configured to switch the storage unit between an accessible position and a secure position; and a control system configured to: determine a storage unit configuration for the device based on the storage unit release mechanism; in response to an access request: identify a designated storage unit of the plurality of storage units; release the storage unit release mechanism for the designated storage unit to allow access to the designated storage unit.

17 Claims, 6 Drawing Sheets

(56) References Cited

U.S. PATENT DOCUMENTS

| | | | | |
|---|---|---|---|---|
| 6,151,536 | A | 11/2000 | Arnold et al. | |
| 6,272,394 | B1 | 8/2001 | Lipps | |
| 6,385,505 | B1 | 5/2002 | Lipps | |
| 7,835,819 | B2 | 11/2010 | Duncan et al. | |
| 8,140,187 | B2 | 3/2012 | Campbell et al. | |
| 8,554,364 | B2 | 10/2013 | Holmes et al. | |
| 9,589,162 | B1 | 3/2017 | Graybill et al. | |
| 9,694,488 | B2 | 7/2017 | Savage et al. | |
| 9,910,965 | B2 | 3/2018 | Bufalini et al. | |
| 11,260,224 | B2 | 3/2022 | Schmidt | |
| 11,260,524 | B2 | 3/2022 | Savage et al. | |
| 2007/0135965 | A1 * | 6/2007 | Nguyen ............... | A61G 12/001 700/231 |
| 2010/0106291 | A1 * | 4/2010 | Campbell ........... | E05B 47/0002 340/3.1 |
| 2012/0099255 | A1 | 4/2012 | Lee et al. | |
| 2013/0320820 | A1 * | 12/2013 | Rahilly ................... | G07F 11/18 312/215 |
| 2020/0226545 | A1 | 7/2020 | Reid | |
| 2021/0304122 | A1 * | 9/2021 | Dattamajumdar ..... | G16H 40/20 |
| 2021/0304862 | A1 | 9/2021 | Moreno et al. | |
| 2022/0207479 | A1 | 6/2022 | Reid et al. | |
| 2023/0172353 | A1 * | 6/2023 | Mensing et al. ....... | A47B 67/02 312/249.11 |

* cited by examiner

ASSET MANAGEMENT DEVICE WITH AUTOMATIC CONFIGURATION DETECTION

CROSS REFERENCE TO RELATED APPLICATIONS

This application claims priority from U.S. Application No. 63/441,647 filed on Jan. 27, 2023, and is a continuation-in-part of U.S. application Ser. No. 18/425,362 filed Jan. 29, 2024, the contents of which are incorporated herein by reference.

FIELD

The specification relates generally to asset management consoles, and more particularly to an asset management console with automatic configuration detection.

BACKGROUND

Electronic inventory dispensing solutions for asset management may be utilized in a variety of sectors. For example, tool cabinets may store and track tools, while pharmacy applications may store and track usage and inventory levels of drugs.

SUMMARY

According to an aspect of the present specification an example device includes: an enclosure; a plurality of storage units supported in the enclosure, each storage unit having a storage unit release mechanism configured to switch the storage unit between an accessible position and a secure position; and a control system configured to: determine a storage unit configuration for the device based on the storage unit release mechanism; in response to an access request: identify a designated storage unit of the plurality of storage units; release the storage unit release mechanism for the designated storage unit to allow access to the designated storage unit.

According to another aspect of the present specification, an example method includes: determining a storage unit configuration for a plurality of storage units in the asset management device; receiving an access request, and in response to the access request: identifying a designated storage unit of the plurality of storage units; and releasing a storage unit release mechanism for the designated storage unit to allow access to the designated storage unit.

BRIEF DESCRIPTION OF DRAWINGS

Implementations are described with reference to the following figures, in which.

DETAILED DESCRIPTION

Electronic inventory dispensing solutions may offer security measures and control access by selectively providing access based on each access request. However, existing electronic inventory dispensing solutions are typically static in order to allow predictability for the automatic access control.

In the present example, an asset management device includes configurable compartments with embedded detection elements to allow for automatic detection of compartment configuration for further flexibility of the asset management device.

Figure 1:
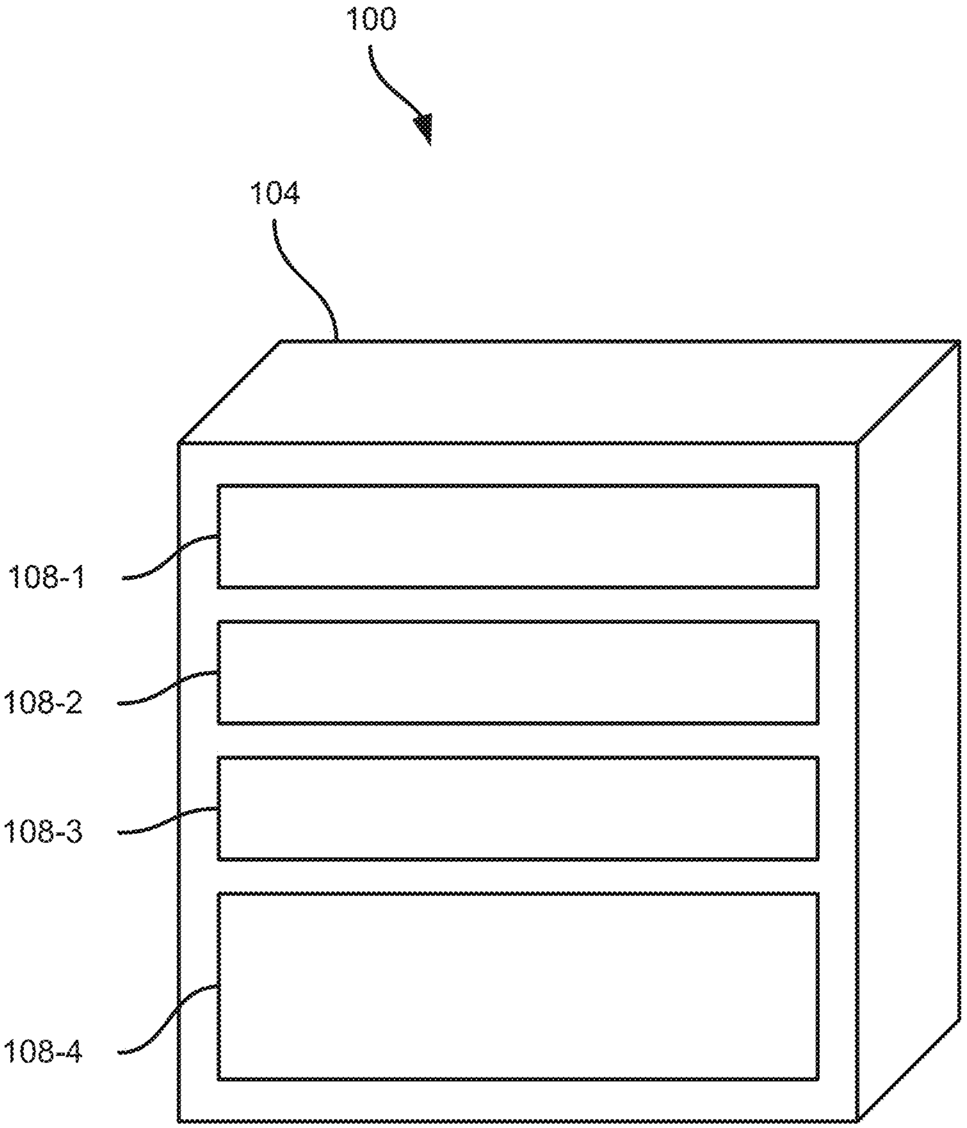
FIG. 1 depicts an example asset management device with automatic configuration detection in accordance with the present disclosure.

FIG. 1 depicts an example asset management device 100 in accordance with the present disclosure. The asset management device 100 (also referred to herein as simply the device 100) is generally configured to house assets or items which may be dispensed to users. For example, the device 100 may be a type of vending machine or the like to dispense items upon sale to the user, an organizational cabinet, console, or the like to store different types of equipment (e.g., including hardware, tools, medical devices, etc.), medications (e.g., including tablets, capsules, etc.), or similar. For example, the device 100 may be deployed in a facility such as a hospital, a warehouse, an office building, or other the like.

The device 100 includes an enclosure 104 in which the items are housed. The enclosure 104 supports a plurality of storage units 108, of which four example storage units 108-1, 108-2, 108-3, and 108-4 (referred to herein generically as a storage unit 108 and collectively as storage units 108; this nomenclature is also used elsewhere herein) are depicted. In other examples, the enclosure 104 may support more or fewer storage units 108. The enclosure 104 may include a suitable frame, and may further include wheels, motors, navigational units, batteries, and the like to support the operation and optional mobility of the device 100.

Each storage unit 108 is configured to have a secure position, as depicted in FIG. 1, and an accessible position, in which the interior of the storage unit 108 is accessible by a user. The storage unit 108 may include a release mechanism to both lock the storage unit 108 in the secure position and to release the storage unit 108 to the accessible position to allow access to the storage unit 108. Further, the storage units 108 may include one or more actuators to automatically switch the storage unit 108 between the secure position and the accessible position. For example, the storage units 108 may include drawer units or locker units, and hence may also be referred to herein as drawer units 108 or locker units 108.

The drawer units may slide or extend from the enclosure 104 using rails, slides, runners, belts, or the like. In some examples, the device 100 may include one or more springs, pistons, actuators, biasing mechanisms or the like to automatically move the drawer units. In other examples, each drawer unit may include a handle or pull to allow a user to manually move the drawer unit. The release mechanism may serve as a locking mechanism to secure the drawer unit in the secured position, in which the drawer unit is not able to be extended from the enclosure 104.

The locker units may be enclosed by front doors and walls. For example, the front doors may be hinged doors, sliding doors, tambour doors, or other suitable doors. The release mechanism may include an electric latch to be combined with a striker and may be operable by a door controller.

The release mechanism may preferably be consistently oriented relative to each of the storage units 108 (e.g., at one side of the enclosure 104) and electrically connected to a controller for the device 100. In particular, the storage units 108 may be substantially modular, such that the device 100 may include combinations of locker units and drawer units according to the storage requirements for the device 100. For example, the device 100 may include one or more locker units to store larger or wider items, while drawer units may store smaller items. Further, the drawer units may positioned at or below an average eye level of users to facilitate visibility into the drawer units. The configuration of the storage units 108 included in a given device 100 may vary from device to device, and may be automatically self-detected according to detection of the release mechanisms of each storage unit 108.

For example, the configuration of the storage units 108 may be automatically detected by leveraging current consumption measurements while the latch (i.e., release mechanism) is active, as will be described in further detail below. That is, the device 100 may identify each of the storage units 108 as either a locker unit or a drawer unit, and for the drawer units, may apply automatic detection of the compartment configuration. The device 100 may further detect the heights of each of the storage units 108 as part of the detection of the storage unit configuration of the device 100 as a whole. That is, the device 100 may determine a number of each type of storage unit, a position of each of the storage units within the enclosure 104, and a dimension of each of the storage units.

In some examples, each storage unit 108 may include a handle with lights to guide users. For example, around the drawer and/or door handle, a light-emitting diode (LED) bar may be installed. The LED bar may be configured to change color or to blink. For example, when the storage unit 108 is not closed properly, the LED bar may be controlled to periodically flash a red light as an alert. The LED bar may be lit up with a blue or green light at a designated drawer or locker unit as an indicator.

In still further examples, the device 100 may be configured to automatically switch or actuate the storage units 108 to move to the accessible position based on an access request (as will be described further herein), while expecting a user to manually return the storage units 108 to the secure position (e.g., by closing the door of the locker unit, or sliding the drawer unit shut. In some examples, the device 100 may further include, in the enclosure 104, location sensors to detect the distance that the drawer units extend. The location sensors may be associated with individual drawer units, or the device 100 may include one location sensor for all of the drawer units or predefined subset of the drawer units.

Figure 2:
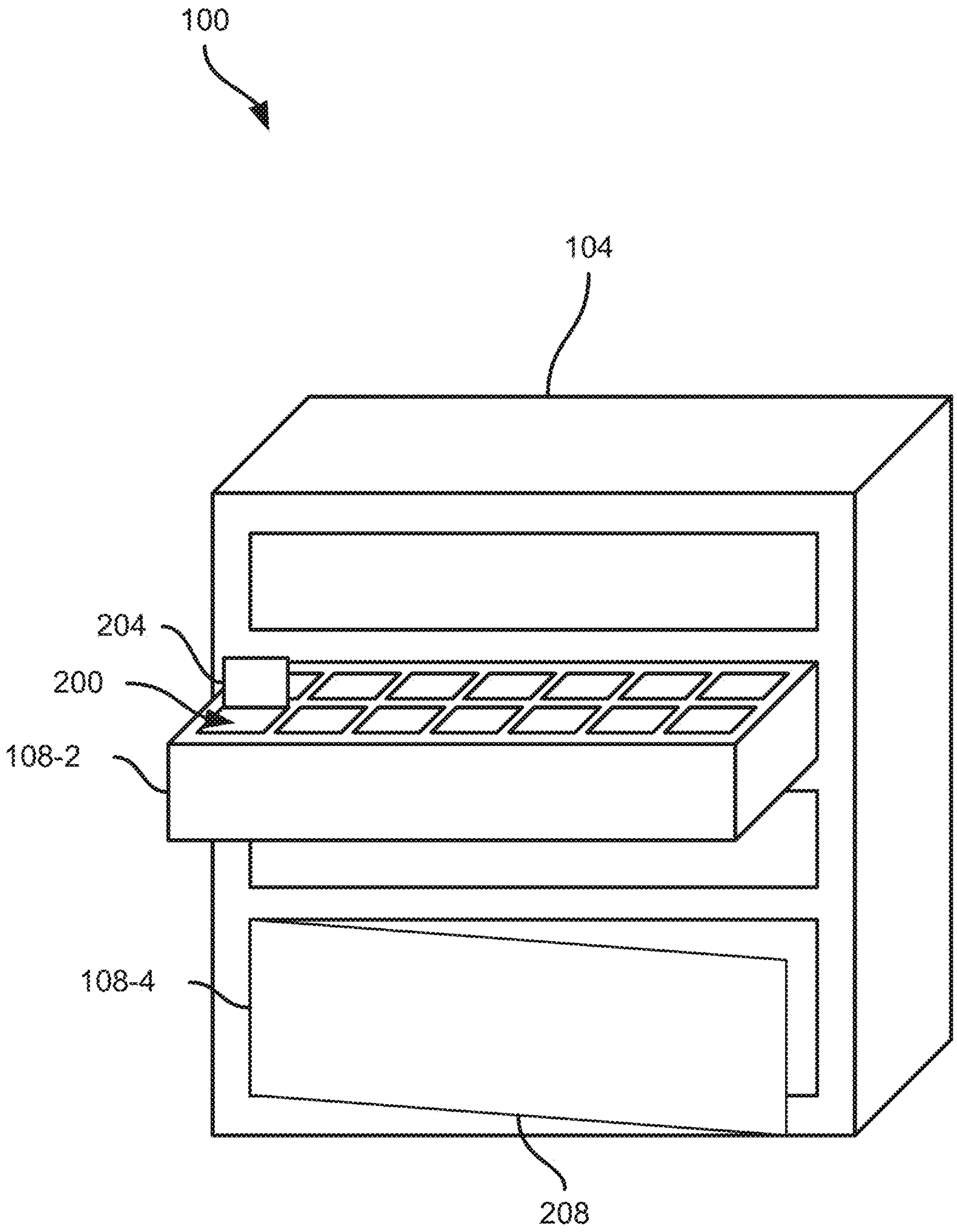
FIG. 2 depicts the asset management device of FIG. 1 with a drawer unit in an accessible position.

FIG. 2 depicts the device 100 with a drawer unit 108-2 in the accessible position, extended from the enclosure 104. The drawer unit 108-2 is divided into a plurality of compartments 200. Each compartment 200 includes a compartment door 204 which is selectively securable using any suitable locking mechanism, including one or more latches, pins, slides, magnets, springs, and the like.

When the locking mechanism of a given compartment door 204 is released, the compartment doors 204 are similarly capable of moving between a closed position and an open position, for example by a hinge mechanism, a tambour door or roller mechanism, a sliding mechanism, or similar. Preferably, the compartment doors 204 may be configured such that the compartment doors 204 are biased to the closed position when the drawer unit 108 is returned from the accessible position to the secured position. In the present example, one of the compartment doors 204 is shown in the open position, while the other compartment doors 204 are in the closed position. In some examples, the compartment doors 204 may include one or more springs, pistons, actuators, biasing mechanisms or the like to automatically move between the open and closed positions, while in other examples, each compartment door 204 may include a handle or pull to allow a user to manually move the compartment door 204 between the open and closed positions. In still further examples, the compartment door 204 may be configured to be biased or automatically moved to the open position, while expecting a user to manually return the compartment door 204 to the closed position. Even though a user does not manually return the compartment door 204, the compartment doors 204 may preferably be oriented (e.g., hinged) in a configuration to prevent collisions with an upper storage unit 108. In further examples, the unreturned compartment door(s) can avoid collision with an upper hinged door.

FIG. 2 further depicts a locker unit 108-4 having a front door 208 in an accessible position.

Figure 3:
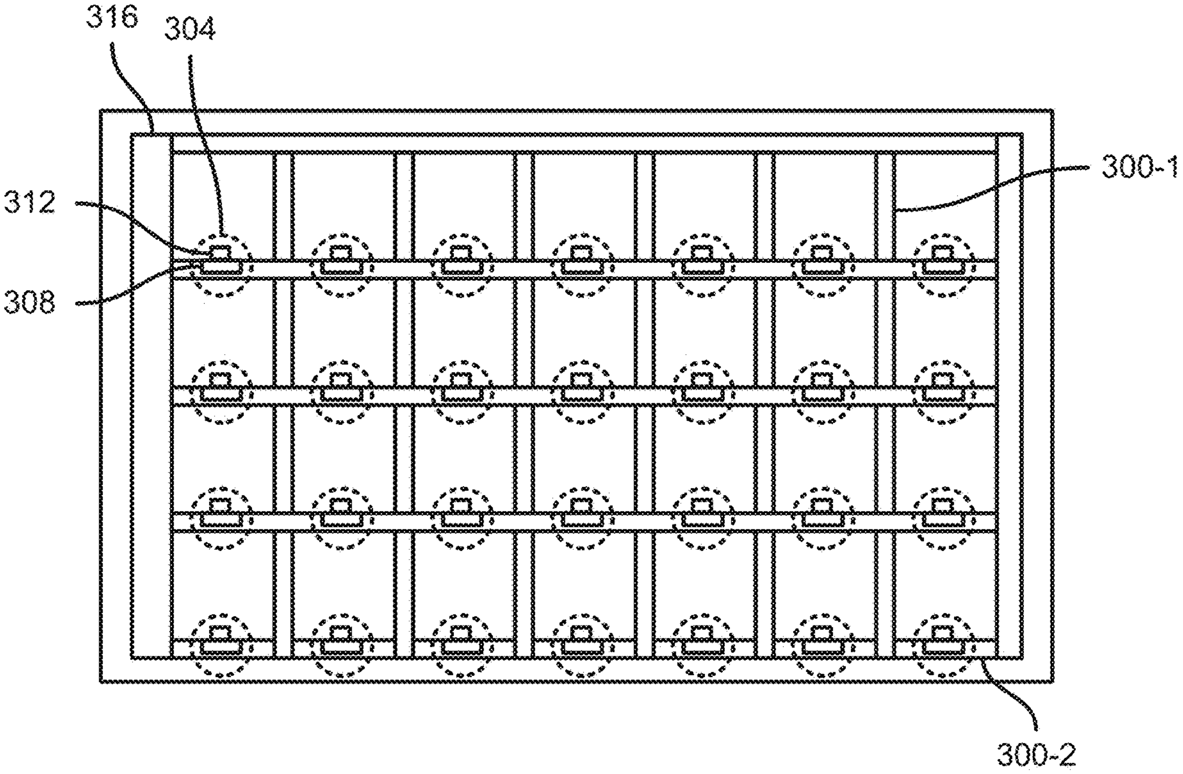
FIG. 3 depicts an example drawer unit of the asset management device of FIG. 1.

FIG. 3 depicts a top view of a drawer unit 108 with the compartment doors 204 removed. In particular, the compartments 200 are defined in the drawer unit 108 by a plurality of dividers 300, including six vertical dividers 300-1 and four horizontal divider 300-2, resulting twenty-eight (4×7) compartments. The dividers 300 are configured to divide the interior of the drawer unit 108 into the compartments 200. In some examples, both the vertical dividers 300-1 and the horizontal dividers 300-2 may be configurable within the drawer unit 108. In other examples, one set of dividers (e.g., the vertical dividers 300-1) may be fixed, while the other set of dividers (e.g., the horizontal dividers 300-2) may be configurable.

In the present example, connection points 304 may be defined on the horizontal dividers 300-2 to receive a corresponding latch of a compartment door for the resulting compartment.

The drawer unit 108 further includes at least one detection element 308 configured to monitor the connection points of the drawer unit 108. In the present example, the detection elements 308 may be integrated into the connection points 304, and hence the drawer unit 108 includes as many detection elements 308 as connection points 304. For example, the detection elements 308 may be a socket or the like to which a corresponding connection element 312 is configured to connect when the divider 300 is connected to the connection point 304. In the present example, the connection element 312 may be the latch on the compartment door 204. That is, the detection element 308 and the corresponding connection element 312 may complete or form an electronic circuit to allow the detection element 308 to monitor and identify the connection to the connection point 304. Further, the detection element 308 may be configured to identify the compartment door 204 connected at the connection point 304, for example by an identifier, to infer the compartment configuration.

In other examples, other types of detection elements 308 are also contemplated. For example, rather than monitoring connection points 304 for latches of the corresponding compartment doors 304, the connection points 304 may be to receive the dividers 300. In such examples, the dividers 300 may have a predefined configuration, for example extending across an entire length or width of the drawer unit 108, or having a predefined shape. In other examples, the configuration or shape of the dividers 300 may be inferred by the detection element 308. For example, each detection element 308 may have two corresponding sockets, located at each end of the vertical or horizontal divider to complete an electronic circuit via the divider 300. In other examples, the dividers 300 may encode self-identifying information which may be detected by the detection elements 308 (e.g., via communication of a signal through the detection element 308 to the connection element 312) to identify the configuration of the dividers 300.

In still further examples, the detection elements 308 may be configured to monitor the connection points 304 in a one-to-many relationship. For example, the detection elements 308 may include one or more cameras (e.g., two cameras for stereoscopic functions) configured to capture an image of the drawer unit 108 when in the accessible position and apply image analysis of the drawer unit 108 to identify and monitor the connection points of the drawer unit 108. For example, the camera may expect a matrix (i.e., having a length and width) of compartments and may recognize the configuration based on the expected matrix. This example may also apply to identifying and monitoring items to be stored.

In the present example, the detection elements 308 are interconnected with a storage unit controller 316. For example, the storage unit controller 316 may include a central processing unit (CPU), a microcontroller, a microprocessor, a processing core, a field-programmable gate array (FPGA), or similar. The storage unit controller 316 may include multiple cooperating processors. The storage unit controller 316 may cooperate with a memory (not shown), including a suitable combination of volatile and/or non-volatile memory, some or all of which may be integrated with the storage unit controller 316.

In particular, with respect to the example storage unit 108 depicted in FIG. 3 being a drawer unit 108, the storage unit controller 316 may be referred to with respect to FIG. 3 as a drawer unit controller 316. In particular the drawer unit controller 316 may execute computer-readable instructions stored on the memory to determine a compartment configuration of the compartments 200 based on the dividers 300 detected by the detection elements 308. In some examples, the drawer unit controller 316 may further be interconnected with the compartment doors 204 to release the respective locking mechanisms to allow the compartment doors 204 to be moved from the closed position to the open position.

Figure 4A:
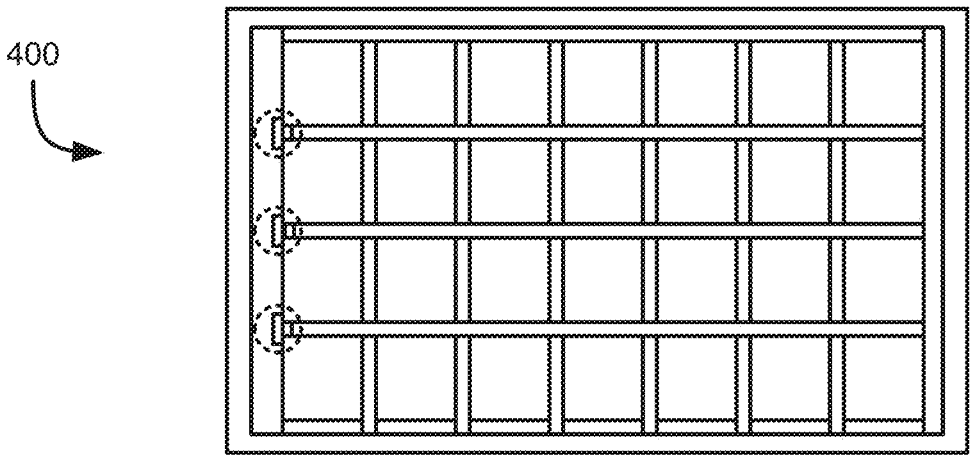
FIGS. 4A-C depict example configurations of drawer units.
Figure 4B:
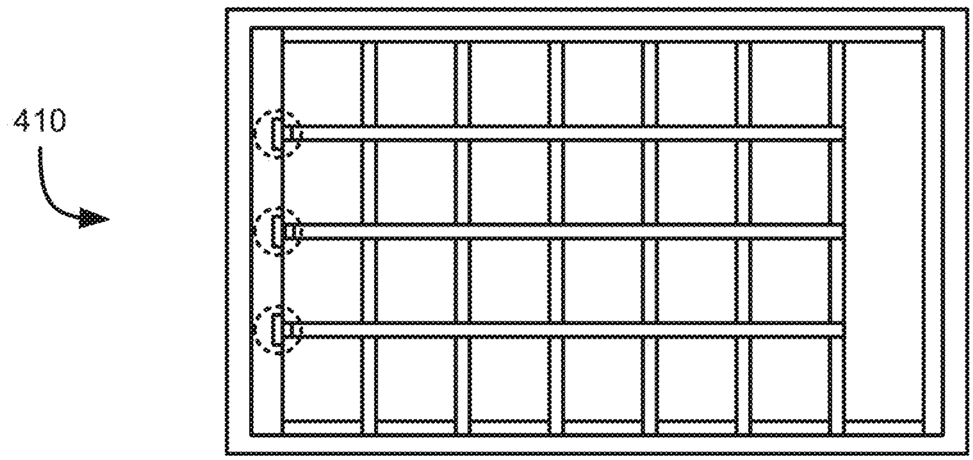
Figure 4C:
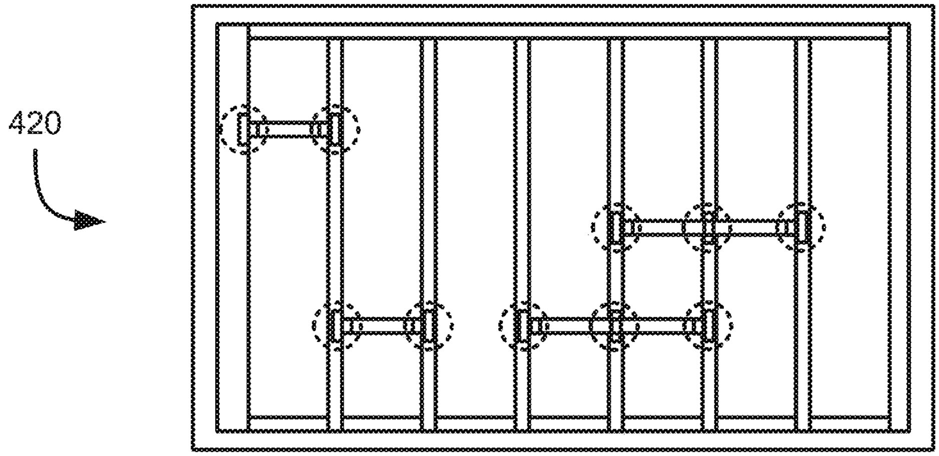

Referring to FIGS. 4A-4C three example configurations of compartments within a drawer unit 108 are depicted. In configuration 400 as depicted in FIG. 4A, the detection elements 308 may monitor the connection points 304 to which the horizontal dividers 300-2 are configured to connect. That is, in this example, the connection points 304 may represent portions of the drawer unit 108 which may accept a divider 300 in order to divide the interior of the drawer unit 108 into compartments. For example, the connection points 304 may include a slot, a notch, or similar to receive and secure the divider 300 at the connection point 304. The detection elements 308 may detect that the connection points 304 for the horizontal dividers 300-2 are employed to connect a respective horizontal divider 300-2. In some examples, further detection elements 308 may detect that six connection points 304 for the vertical dividers 300-1 are employed to connect a respective vertical divider 300-1, while in other examples, the vertical dividers 300-1 may be fixed at six vertical dividers 300-1. In either case, the drawer unit controller 316 may determine, based on a predefined definitions of the dividers 300 that twenty-eight compartments 200 are defined.

In the configuration depicted in FIG. 4B, the detection elements 308 may similarly detect that the connection points 304 for the horizontal dividers 300-2 are employed to connect a respective horizontal divider 300-2. In the present example, the horizontal dividers 300-2 may self-encode the configuration that they extend across only to the sixth of the fixed vertical dividers 300-1. The drawer unit controller 316 may therefore determine, based on the identification of the configuration of the horizontal dividers 300-2 at the detection elements 308, that the twenty-five compartments 200 are defined.

In configuration 420 depicted in FIG. 4C, connection points 304 (and corresponding detection elements 308) may be defined on the fixed vertical dividers 300-1 in addition to the connection points 304 defined at an edge of the drawer unit 108. For example, the vertical dividers 300-1 may include slots with detection elements 308 within which the horizontal dividers 300-2 are configured to be seated to secure the horizontal dividers 300-2 in place. Accordingly, the detection elements 308 may detect the span of each horizontal dividers 300-2 based on the connection points on the vertical dividers 300-1 to allow the drawer unit controller 316 to determine that thirteen compartments 200 are defined.

In still further examples, other configurations or arrangements of dividers 300 are contemplated, along with corresponding connection points 304 within the drawer unit 108.

Figure 5:
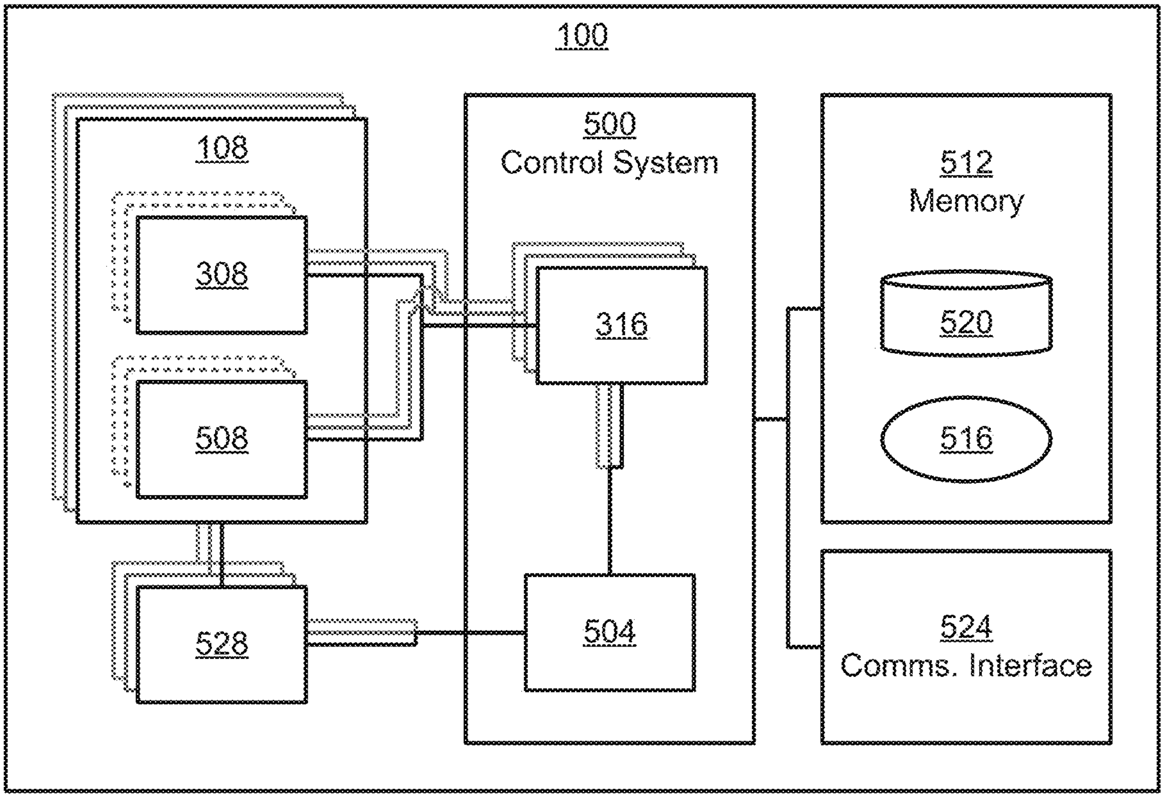
FIG. 5 depicts a block diagram of certain internal components of the asset management device of FIG. 1.

Turning now to FIG. 5, a block diagram of certain internal components of the device 100 are depicted. The device 100 includes a control system 500 including a plurality of storage unit controllers 316 and a device controller 504. For storage units 108 being locker units, the storage unit controllers 316 may be door controllers 316, while drawer units may have the storage unit controllers 316 being drawer unit controllers 316 as described above.

Each of the drawer unit controllers 316 (i.e., for drawer units 108) may be interconnected with a corresponding set of detection elements 308 for the respective drawer unit 108 (for convenience, only one detection element 308 is illustrated; as noted above, each drawer unit 108 may include multiple detection elements 308). That is, the storage unit controllers 316 may be configured to communicate with the detection elements 308 to identify the dividers 300 employed in the respective drawer units 108 and to determine a compartment configuration for the drawer unit 108.

Each of the drawer unit controllers 316 may additionally be interconnected with a corresponding set of locking mechanisms 508 for each of the compartment doors 204 of the respective drawer unit 108 (for convenience, only one locking mechanism 508 is illustrated; in practice, each drawer unit 108 may include as many locking mechanisms 508 as compartment doors 204). For example, the locking mechanisms 508 may include one or more latches, pins, slides, magnets, solenoids, and the like, configured to be electrically released via control from the storage unit controller 316. That is, the drawer unit controllers 316 are further configured to control the locking mechanisms 508 on each of the compartment doors 204 to selectively release one or more of the locking mechanisms 508 and allow the corresponding compartment door 204 to be moved to the open position to allow access to the corresponding compartment 200.

In some examples, the drawer unit controllers 316 may further be interconnected with one or more springs, biasing mechanisms, or the like, for each of the compartment doors 204 to automatically move the compartment door 204 to the open position after releasing the corresponding locking mechanism 508. In other examples, the release mechanism for the compartment doors 204 may be integrated with the locking mechanism 508.

In the present example, the storage unit controllers 316 are illustrated as being functionally part of the control system 500; in practice the storage unit controllers 316 may be physically located within each corresponding drawer unit 108.

In some examples, the storage units 108 may further include one or more supplemental features for the storage unit 108 and/or localized to each compartment 200 within a drawer unit 108. For example, when the dividers 300 have predefined options (e.g., shape of divider being vertical and horizontal dividers and fixed divider positions/connection points), the potential available compartments which may be defined is also fixed. Accordingly, the supplemental compartment features may be regionalized based on a smallest unit compartment and interconnected with the drawer unit controllers 316 to be activated by compartment based on the determined compartment configuration.

For example, the configuration 400 shown in FIG. 4A may divide a drawer unit 108 into its unit compartments. Accordingly, in the configurations 410 or 420, one or more of the unit compartments may be combined to form the respective larger compartments. The drawer unit controller 316 may determine which unit compartments are assigned to a given detected (larger) compartment in the compartment configuration.

For example, the supplemental features may include weight sensors to measure the weights of items stored in each compartment 200 or in the locker unit 108 as a whole. In some examples, the weight sensors may detect the weight difference when the compartment door 204 is in the open versus the closed position. For example, opening the compartment door 204 may apply or remove some pressure from the weight sensors based on the orientation of the compartment door 204. The weight sensors may allow the device 100 to be used, for example to allow items to be collected when the weight in a given compartment 200 reaches a predefined threshold weight level. Thus, for example, the device 100 may act as a collection bin for recycling, scrapping, etc.

Similarly, the weight sensors may detect the weight difference when the front door of the locker unit 108 is in the secured versus the accessible position.

In other examples, the supplemental features may be heating and/or cooling devices and/or structures, such as temperature sensors, Peltier devices, insulation, moisture controls, and the like. The supplemental features may further include lights, such as light-emitting diodes (LEDs), cameras and/or imaging units for analysis, and the like. The supplemental features may further include devices for charging, sanitizing and/or cleaning, cutting/grinding, cables for power or communications, and the like.

The storage unit controllers 316 may further be interconnected with the device controller 504, which may be a CPU, a microcontroller, a microprocessor, a processing core, an FPGA, multiple cooperating processors, or similar. The controller 504, or more generally, the control system 500 (i.e., including the storage unit controllers 316), may be interconnected with a memory 512, which may include a combination of volatile (e.g., Random Access Memory or RAM) and non-volatile memory (e.g., read-only memory or ROM, Electrically Erasable Programmable Read Only Memory or EEPROM, flash memory). The memory 512 stores applications, each including a plurality of computer-readable instructions executable by one of the controllers 316 or 504. The execution of the instructions configures the device 100 to perform the actions discussed herein. In some examples, some or all of the functions described herein as being executed by the storage unit controllers 316 may be performed by the device controller 504 or vice versa.

For example, the applications stored in the memory 512 may include a control application 516. When executed, the control application 516 may configure the device 100 to perform the automatic configuration detection, and to process access requests. The application 516 may also be implemented as a suite of distinct applications (e.g., including separate applications for the automatic drawer unit configuration detection and for the access request processing). Further, some or all of the functionality of the application 516 may be implemented as dedicated hardware components such as one or more FPGAs or application-specific integrated circuits (ASICs).

The memory 512 also stores a repository 520 storing rules and data for the operations of the device 100. For example, the repository 520 may store the determined storage unit configuration for the device 100 as a whole, the determined compartment configurations for each of the drawer units 108, item information for items stored in the compartments 200, including identifying information, access information and location information (e.g., including a storage unit identifier and a compartment identifier), and the like.

The device 100 may further include a communications interface 524 interconnected with the control system 500. The communications interface 524 may be configured for wireless (e.g., satellite, radio frequency, Bluetooth, Wi-Fi, or other suitable communications protocols) or wired communications and may include suitable hardware (e.g., transmitters, receivers, network interface controllers, and the like) to allow the device 100 to communicate with other computing devices. The specific components of the communications interface 524 are selected based on the types of communication links that the device 100 communicates over.

The asset management device 100 can designate the other system when the device 100 cannot offer a proper service. For example, when the device cannot provide an item requested by a user, the device can call/designate the other system which is available to provide the item. The user can access to the other device near to the device conveniently. The user can also search a proper device through the one's mobile device in advance.

The device 100 may further include one or more input and/or output devices (not shown). The input devices may include one or more buttons, keypads, touch-sensitive display screen, mice, or the like for receiving input from an operator. The output devices may include one or more display screens, monitors, speakers, sound generators, vibrators, or the like for providing output or feedback to an operator.

For example, the input and/or output devices may include a user interface module configured to provision augmented reality, virtual reality, or 3-dimensional content, graphical interfaces, voice-recognition and/or activation features, biometric detection systems, generative artificial intelligence features, and the like.

The device 100 further includes a plurality of storage unit release mechanisms 528, for example, one storage unit release mechanism 528 corresponding to each storage unit 108. The storage unit release mechanisms 528 may be interconnected with the device controller 504. That is, the device controller 504 may be configured to control the storage unit release mechanisms 528 (e.g., based on an access request at the device 100) to selectively release one or more storage units 108 to allow the storage units 108 to move from the secured position within the enclosure 104 to the accessible position extended from the enclosure 104 (i.e., as in the case for drawer units 108), or to release the front doors of the locker units 108 to move from the secured position to the accessible position. In other examples, the storage unit release mechanisms 528 may be controlled by the individual storage unit controllers 316 in cooperation with the device controller 504. For example, the storage unit release mechanisms 528 may include latches, magnets, solenoids, or the like to lock or secure the storage units 108 in the secure position until released by the device controller 504. Additionally, the storage unit release mechanism 528 may include one or more rails, slides, belts, or the like to automatically move the drawer unit 108 to the accessible position upon release by the device controller 504, or other springs or biasing mechanisms to release the door of the locker unit 108.

In particular, in operation, the device 100 is generally configured to automatically determine the storage unit configuration of the storage units 108 in the device 100 as a whole, as well as the compartment configuration for each of the drawer units 108. The device 100 may store the storage unit configuration and the compartment configuration, and process access requests for the storage or retrieval of items according to the stored configurations.

Figure 6:
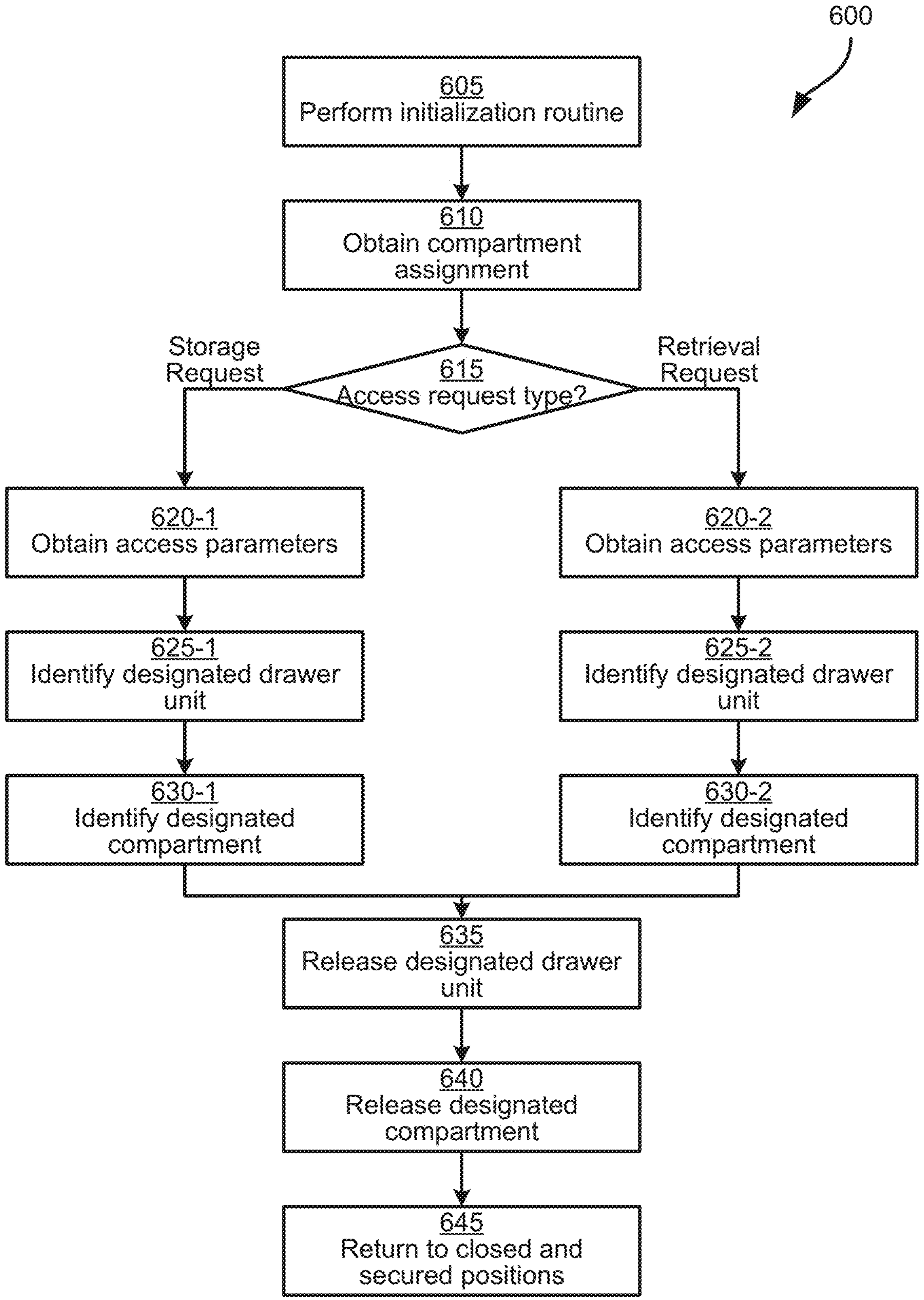
FIG. 6 depicts a flowchart of an example method of operating an asset management device with automatic configuration detection.

For example, turning now to FIG. 6, the functionality implemented by the device 100 will be discussed in greater detail. FIG. 6 illustrates a method 600 of providing secure access for items. The method 600 will be discussed in conjunction with its performance by the device 100, with reference to the components of FIGS. 1 to 5. In other examples, the method 600 may be performed by other suitable devices or systems.

At block 605, the device 100 performs an initialization routine to determine its internal configuration, for example by determining a storage unit configuration of the plurality of storage units 108 and a compartment configuration for each of the drawer units 108 in the device 100. That is, the determination of the configuration of storage units 108 can be included in the initialization routine to determine the quantity and dimensions of storage units 108, and in particular of drawer units 108 and locker units 108.

In particular, to determine the configuration of the storage units, the device controller 504 may measure current consumption while the latch (or other suitable storage unit release mechanism) is active. In particular, the controller 504 may measure a base current consumption of the system while all latches are inactive. The controller 504 may then activate one of the latches. The controller 504 may measure the current consumption of the system and subtract the base current consumption to obtain a delta, which may be used to evaluate if the latch is connected and operating normally. The controller 504 may iterate through each of the latches to create an internal map based on the detected latches. For example, in addition to detecting a delta of current consumption, the controller 504 may signal the latches (or release mechanism) to obtain information about the type of storage unit, including for example, the dimensions of the storage unit (e.g., the height of a given drawer unit). Alternately, the delta of current consumption may vary based on the type and dimensions of the storage unit, and the controller 504 may map the delta of the current consumption to predefined values or ranges to automatically determine the type of storage unit to generate the internal map. The internal map may be interpreted to automatically determine the storage unit configuration. Furthermore, the current consumption for each latch can be logged and monitored overtime whenever a latch is actuated to determine if a latch failure has occurred, or whether a trend suggest the latch might be reaching its end of life and provide predictive maintenance.

The device controller 504 may further signal each of the drawer unit controllers 316 to perform an operation to determine the compartment configuration for the respective drawer unit 108. In response to the signal, each drawer unit controller 316 may, for example, obtain signals from each of the connected detection elements 308 to determine if the monitored connection points 304 are in use (i.e., have a divider 300 connected thereto). For example, the drawer unit controller 316 may send a current to one pin of each detection element 308 and determine if a signal is received at a paired pin, indicating that the pins are electrically connected via a connection element 312 of a divider 300. In some examples, the drawer unit controller 316 may additionally identify a configuration of the divider 300 itself, for example by sampling a return signal to extract an identifier of the divider 300, or by inferring the configuration of the divider 300 based on the active connection points 304 as indicated by the detection elements 308.

Upon determining the respective configurations, the device controller 504 and the storage unit controllers 316 may store the determined configurations in the repository 520. That is, the storage unit configuration including the number and dimensions of locker units and drawer units may be stored. Additionally, in some examples, the compartment configuration for each drawer unit 108 may be stored with an association of each unit compartment within the drawer unit 108 to a corresponding compartment of the compartment configuration.

At block 610, the device 100 may optionally obtain a storage assignment, indicating the assignment of items stored or contained in each of the compartments 200 and/or the storage unit 108 identified in the storage unit configuration and/or the compartment configuration for an individual drawer unit 108. For example, the device 100 may identify that a compartment assignment is to be obtained based on a detected weight by weight sensors in each of the unit compartments. The device 100 may then send a request to a managing operator of the device 100 to identify the compartment assignment for the compartments in which items were detected by the weight sensors. In other examples, the compartment assignment may be proactively loaded and stored in the repository 520 by the managing operator.

At block 615, the device 100 may receive an access request, for example at an input device (e.g., including a screen, keyboard, etc., associated with the device 100). For example, the access request may be a storage request or a retrieval request. In some examples, during the access request, the device 100 may display or otherwise output the results of the initialization operation, for example to illustrate the storage unit configuration and/or compartment configuration of specific drawer units. For example, the device 100 may permit the user to interact with the displayed configuration to select a suitable storage unit and/or compartment for the access request. Alternatively, the device 100 may suggest a suitable storage unit and/or compartment for the access request and may display the identified designated storage unit and/or compartment for the user's information. If the access request is a storage request, the device 100 proceeds to block 620-1.

At block 620-1, the device 100 obtains access parameters pertaining to the storage request. In some examples, the access parameters may be item based, while in other examples, the access parameters may be account and/or user based.

For example, item-based parameters may include item information, such as an item identifier and/or item dimensions, or the like. For example, the device 100 may obtain an item identifier (e.g., from a predefined list of items, based on a barcode, universal product code identifier or the like) and may determine dimensions, weight, or other parameters of the item based on the item identifier. In other examples, the device 100 may simply request and obtain the dimensions, weight, or other parameters of the item, or may determine the item parameters based on analysis of image and/or depth data obtained by an image and/or depth camera designated for item scanning.

In such examples, the device 100 may process the storage request and assign a suitable compartment for storage based on the item information, as described below. In some examples, the item parameters may further include storage parameters, such as suitable storage temperatures or other conditions for storing the item.

In other examples, additionally or alternatively, the access parameters may be account and/or user based. That is, certain users or accounts may be assigned to certain compartments within the device 100, and accordingly, the device 100 may verify account credentials to identify the assigned compartment for storage based on the account parameters.

At block 625-1, the device 100 identifies, based on the access parameters, a designated storage unit for the storage request. For example, the designated storage unit may be selected based on a height, depth or width of the item and a corresponding height or depth of the designated storage unit. For example, wider items may be assigned to a locker unit as the designated storage unit, since locker units may not be divided into compartments. In other examples, the designated storage unit may be predefined based on the account.

At block 630-1, the device 100 identifies, if appropriate, based on the access parameters, a designated compartment based on the compartment configuration for the designated drawer unit. For example, the designated compartment may be selected on a length and width of the item and a corresponding length and width of the compartment, and/or heating and or cooling or other storage parameter capabilities of the compartment. In other examples, the designated compartment may be predefined based on the account.

Since each of the drawer units 108 may have different compartment configurations, in some examples, blocks 625-1 and 630-1 may be performed in reverse order and/or substantially simultaneously. For example, only one of the drawer units 108 may have a compartment that is suitably sized to store the requested item, and hence the selection of the suitably sized compartment may inform the designation of the drawer unit.

If the access request at block 615 is a retrieval request, the device 100 proceeds to block 620-2. At block 620-2, the device 100 obtains access parameters pertaining to the retrieval request. In some examples, the access parameters may be item based, while in other examples the access parameters may be account and/or user based.

For example, item-based parameters may include item information, such as an item identifier of the item to be retrieved. In other examples, additionally or alternatively, the access parameters may be account and/or user-based. That is, certain users or accounts may be assigned to certain compartments within the device 100, and accordingly, the device 100 may verify account credentials to identify the assigned compartment for storage based on the account parameters.

In some examples, the access parameters may be based on both item parameters and account parameters. For example, certain items (e.g., certain medications, drugs, sensitive equipment, or the like) stored in the device 100 may be protected, and accordingly, when such items are requested, the device 100 may further request authentication of the user's credentials to verify that the user has sufficient permissions to retrieve the requested items. Other items may be dispensed or retrieved without such further authentication.

At block 625-2, the device 100 identifies, based on the access parameters, a designated storage unit for the retrieval request. For example, the designated storage unit may be selected based on the location of the requested item within the device 100. In other examples, the designated storage unit may be predefined based on the account.

At block 630-2, the device 100 identifies, as appropriate, based on the access parameters, a designated compartment based on the compartment configuration for the designated drawer unit. For example, the designated compartment may be selected based on the location of the requested item within the device 100. In other examples, the designated drawer unit may be predefined based on the account.

Blocks 625-2 and 630-2 may similarly be performed in reverse order and/or substantially simultaneously based on the nature of the retrieval request.

At block 635, the device 100 is configured to release the designated storage unit identified at block 625. For example, the controller 504 may send a release signal to the corresponding storage unit release mechanism 528 of the designated storage unit. The storage unit release mechanism 528 may, in some examples, simply unlatch the designated storage unit to allow the storage unit 108 to be switched from the secure position to the accessible position manually by the user. In other examples, the storage unit release mechanism 528 may additionally move the designated storage unit to the accessible position at block 635. For example, drawer units may be manually or automatically extended from the enclosure 104 to the accessible position. Alternately, locker units may have their front doors manually or automatically opened to the accessible position.

At block 640, as appropriate, the device 100 is configured to release the compartment door for the designated compartment identified at block 630. For example, to release the compartment door 204, the controller 504 may signal the corresponding drawer unit controller 316 with an indication of the designated compartment. The drawer unit controller 316 may then send a release signal to the corresponding locking mechanism 508 for the designated compartment. The release of the locking mechanism 508 may then release the compartment door 204. In some examples, releasing the locking mechanism 508 and the compartment door 204 may similarly include moving the compartment door from the closed position to the open position, while in other examples, the user may manually open the compartment door 204.

In some examples, release of the compartment door 204 may additionally initialize other supplemental compartment features of the compartment 200, such as LED lighting to illuminate the interior of the compartment 200, cameras and/or image sensors to monitor the retrieval or storage of the item in the compartment 200, or the like. In other examples, the supplemental features may be activated upon switching of the storage unit 108 to the accessible position (e.g., upon opening the front door or the like).

At block 645, after completion of the access request, the compartment door 204 is returned to the closed position, as appropriate, and the storage unit 108 is returned to the secured position. In some examples, this may be manually performed by the user, while in other examples, the device 100 may be configured to perform the return operation automatically, for example after detecting that the access request is complete (e.g., based on analysis of one or more monitoring devices, based on an indication from the user), or after a predefined timeout, or the like. The device 100 may further update the compartment assignment stored in the repository 520 based on the access request.

In other examples, after a predefined timeout period, the device 100 may send an error alert to indicate to the user and/or to the managing operator that the return operation was not successfully completed. For example, each of the compartment doors 204 and the storage units 108 may be monitored to determine their state (i.e., open or closed, accessible or secured), for example, based on the state of their respective release mechanisms. If at least one compartment and/or drawer unit is not closed, the drawer unit controller 316 and/or the device controller 504 may control the storage unit or the compartment to return to the closed and/or secured positions.

In some examples, the device 100 can include hinged doors in part comprising locker units. In the example, the processes of locker units with the hinged doors can skip compartment related processes.

In other examples, other implementations and embodiments are also contemplated. For example, the asset management device 100 may be deployed as one of a plurality of asset management devices within an asset management system deployed in a facility. In such examples, the asset management system may further include a server in communication with the asset management device 100, and the compartment assignment may further be communicated to the server. In such examples, the asset management device 100 may additionally communicate with the other asset management devices, for example to communicate stock levels of certain inventory or the like. The asset management device 100 may further present the identity and location of nearby additional asset management devices 100 which may store requested inventory.

In other embodiments, the user can call the asset management device to the user. The asset management device can be motorized with electric motors and batteries. The asset management device can be equipped with sensors and cameras to detect surroundings and location information. The server can control several asset management device to place at a proper location.

Further, the asset management device may include other control mechanisms, including augmented reality interfaces, voice recognition capability, and the like.

The scope of the claims should not be limited by the embodiments set forth in the above examples but should be given the broadest interpretation consistent with the description as a whole.

The invention claimed is:

1. An asset management device comprising:

an enclosure;

a plurality of storage units supported in the enclosure, each storage unit having a storage unit release mechanism configured to switch the storage unit between an accessible position and a secure position; and a control system configured to:

determine a storage unit configuration for the device based on the storage unit release mechanism by:

measuring a base current consumption;

iteratively activating one storage unit release mechanism at a time to obtain a delta of current consumption for each of the storage units; and generating an internal map of the storage units based on the respective deltas of current consumption for each of the storage units;

in response to an access request:

identify a designated storage unit of the plurality of storage units;

release the storage unit release mechanism for the designated storage unit to allow access to the designated storage unit.

2. The asset management device of claim 1, wherein each storage unit comprises one of:

a drawer unit having a plurality of compartments; and a locker unit having a front door.

3. The asset management device of claim 2, wherein, in response to an access request, the control system is further configured to, when the designated storage unit is a drawer unit:

determine a compartment configuration of the plurality of compartments of the drawer unit;

identify a designated compartment based on the determined compartment configuration; and release a compartment door for the designated compartment to allow access to the designated compartment.

4. The asset management device of claim 2, wherein to determine the storage unit configuration, the control system is configured to determine a number of drawer units and a number of locker units, a position of each of the storage units within the enclosure and a dimension of each of the storage units.

5. The asset management device of claim 2, wherein to release the storage unit release mechanism for the locker unit, the control system is configured to release the front door of the locker unit to the accessible position.

6. The asset management device of 5, wherein the storage unit release mechanism includes a biasing mechanism to bias the front door to the accessible position.

7. The asset management device of claim 2, wherein the control system is further configured to:

obtain, as part of the access request, dimensions of an item to be stored; and assign the designated storage unit according to the dimensions of the item.

8. The asset management device of claim 1, wherein to generate the internal map, the control system is configured to map the delta of current consumption for a given storage unit to a predefined range to determine a type of the given storage unit.

9. The asset management device of claim 1, wherein to generate the internal map, the control system is configured to signal the storage unit release mechanism of a given storage unit to determine the type of the given storage unit.

10. The asset management device of claim 1, further comprising a communications interface to communicate with one or more of: a user device; a server to manage inventory; and a further asset management device.

11. A method of operating an asset management device, the method comprising:

determining a storage unit configuration for a plurality of storage units in the asset management device by:

measuring a base current consumption;

iteratively activating one storage unit release mechanism at a time to obtain a delta of current consumption for each of the storage units; and generating an internal map of the storage units based on the respective deltas of current consumption for each of the storage units;

receiving an access request, and in response to the access request:

identifying a designated storage unit of the plurality of storage units; and releasing a storage unit release mechanism for the designated storage unit to allow access to the designated storage unit.

12. The method of claim 11, wherein each storage unit comprises one of:

a drawer unit having a plurality of compartments; and a locker unit having a front door.

13. The method of claim 12, further comprising, when the designated storage unit is a drawer unit:

determining a compartment configuration of the plurality of compartments of the drawer unit;

identifying a designated compartment based on the determined compartment configuration; and releasing a compartment door for the designated compartment to allow access to the designated compartment.

14. The method of claim 12, wherein determining the storage unit configuration comprises determining a number of drawer units and a number of locker units, a position of each of the storage units within the enclosure and a dimension of each of the storage units.

15. The method of claim 12, wherein releasing the storage unit release mechanism for the locker unit comprises releasing the front door of the locker unit to the accessible position.

16. The method of claim 12, further comprising:

obtaining, as part of the access request, dimensions of an item to be stored; and assigning the designated storage unit according to the dimensions of the item.

17. The method of claim 11, further comprising communicating with one or more of: a user device; a server to manage inventory; and a further asset management device.

* * * * *